(12) United States Patent
Respondek et al.

(10) Patent No.: US 7,854,249 B2
(45) Date of Patent: Dec. 21, 2010

(54) SOFT TOP CLOTH WITH STYLING EDGE

(75) Inventors: Michael Respondek, Munich (DE); Ulrike Bruggaier, Oberhaching (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/339,910

(22) Filed: Dec. 19, 2008

(65) Prior Publication Data

US 2009/0167050 A1     Jul. 2, 2009

(30) Foreign Application Priority Data

Dec. 21, 2007 (DE) .................. 10 2007 062 093

(51) Int. Cl.
*B60J 7/12* (2006.01)
(52) U.S. Cl. .................. 160/399; 296/107.12; 296/213; 52/222
(58) Field of Classification Search .................. 296/121, 296/107.11, 107.12, 118, 213; 160/399, 160/395; 52/222
See application file for complete search history.

(56) References Cited

U.S. PATENT DOCUMENTS 2,556,565 A * 6/1951 Votypka ..................... 296/118
2,763,509 A * 9/1956 Hennessy ................... 296/118
3,987,835 A * 10/1976 Bloomfield ................. 160/392
4,887,626 A * 12/1989 Dalo et al. .................. 135/119
6,022,064 A    2/2000 Robbins
7,144,063 B2 * 12/2006 Garska ....................... 296/118
2005/0280292 A1    12/2005 Reitzloff
2006/0219374 A1 * 10/2006 McKinney .................. 160/395

FOREIGN PATENT DOCUMENTS

DE    1192529    12/1965

* cited by examiner

*Primary Examiner*—Dennis H Pedder
(74) *Attorney, Agent, or Firm*—Fitch, Even, Tabin & Flannery; John M. Naber

(57) ABSTRACT

The object of providing a technical function edge and a styling edge is solved by the cloth for a soft top according to the invention which is designed to be stretchable over at least one solid element, wherein the solid element comprises at least one offsetting or indentation, and wherein the cloth over-stretching the solid element is deformed by suitable clamping devices such that the cloth substantially follows the contour of the offsetting or indentation in the region of the offsetting or indentation.

9 Claims, 3 Drawing Sheets

SOFT TOP CLOTH WITH STYLING EDGE

Figure 1:
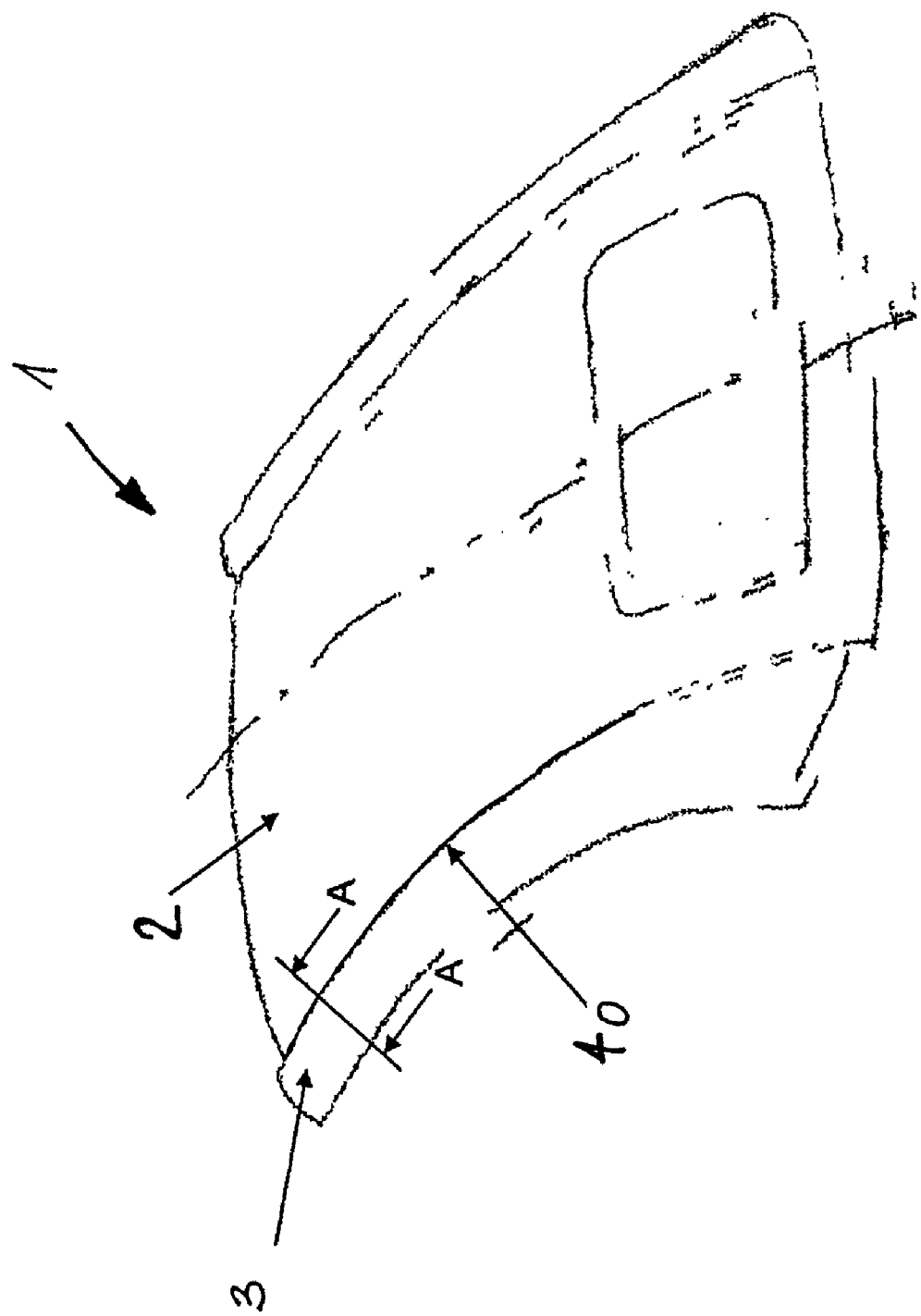

This application claims Paris Convention priority of German Patent Application No.: DE 102007062093.6-24, filed Dec. 21, 2007, the complete disclosure of which is hereby incorporated by reference.

The subject matter of the present invention is a cloth for a soft top of a vehicle which is designed to be stretchable over at least one solid element. The invention is further directed to a soft top with a cloth and a styling edge.

From prior art it is known that soft top cloths represent a continuous area in any direction, i.e. that the roof areas to be overstretched conventionally consist of individual cloth webs that are joined with each other by means of longitudinal and cross seams and form the sphere-like roof area of a vehicle.

Due to the continuous area of a roof it has therefore conventionally not been possible to manufacture technical function edges and grooves from the cloth material. Such function elements, for instance, have to be manufactured from sheet or plastic constructions which are attached to the continuous roof area.

In particular the edges and grooves for the removal of rain and condensation water which are required to prevent the ingress of water into the interior of the vehicle have constituted substantial problems since the use of soft top cloths. This is because function grooves and edges are necessary to prevent the ingress of water, caused by condensation water or rain water in the case of a vehicle that is not in motion, so as to prevent standing water on the abutting faces between the soft top and the carriage as well as the seam regions. It is likewise necessary to prevent the ingress of water into the interior of the vehicle in the case of a vehicle that is in motion. In vehicles equipped with a soft top cloth, the ballooning effect is especially disadvantageous in the case of high speed journeys, so that it is exactly in the case of high speed journeys that the water ingress at the critical abutting faces between the soft top cloth and the carriage has to be prevented.

Due to the above-mentioned disadvantages that have conventionally been solved by plastics or sheet constructions it has turned out to be disadvantageous that, due to the technical circumstances, there remains only very little creative freedom for aesthetic designs of soft top cloths.

Due to the increasing significance of aesthetic designs in the automotive industry it is therefore an object of the present invention to provide a cloth for a soft top by which it is possible to provide both technical function edges and grooves, and to enlarge the aesthetic creative freedom.

This object is solved by the cloth for a soft top in accordance with the invention with the features according to claim 1, and by a soft top for a vehicle which consists of a cloth pursuant to claims 10 and 11.

Advantageous further developments of the present invention are indicated in the subclaims.

In the case of the cloth for a soft top according to the invention, the cloth is designed to be stretchable over at least one solid element, wherein the solid element comprises at least one offsetting or indentation, and wherein the cloth overstretching the solid element is deformed by suitable clamping devices such that the cloth substantially follows the contour of the offsetting or the indentation in the region of the offsetting or the indentation.

Advantageously, the clamping device is designed to be flexible and inherently unstable. In a preferred embodiment of the present invention, the clamping device is a rope that has an elastic modulus that is capable of establishing and maintaining a long-lasting and constant stress state. Steel or plastic ropes are suitable to be used as such a clamping device, wherein the elastic behavior may be conveyed by joined spring elements or the like, and may also be an inherent technical property of the clamping device.

Advantageously, the clamping device is joined with the cloth according to the invention in such a form-locking manner that the application of stress in the clamping device results in that the cloth is deformed and tries to always adapt itself to the clamping device.

The clamping device is expediently guided in a bag or a casing that is arranged at the cloth, for instance, joined with the cloth in a form-locking manner.

In a preferred embodiment of the present invention, the clamping device rests in the stress state substantially in the sole of the offsetting or the indentation of the solid element. Consequently, the cloth also stretches over this shaping solid element. Depending on the arrangement of the solid element, in the present invention this may be the convertible top bow, the roof top, a seal carrier, a kinematics element, or some other shaping solid element that serves for the construction or the stability of the soft top.

Advantageously, the clamping device is arranged such that it forces the cloth according to the invention into the desired shape in the stress state, and, due to the stress state, keeps it there even in the case of high speed journeys. When establishing the elastic module of the clamping device it is therefore important to also incorporate the ballooning effect in the calculation such that a stress state of the clamping device is achieved which counteracts the lifting forces generating the ballooning effect.

In a preferred embodiment of the present invention, at least two partial areas of the cloth according to the invention abut in the area of the offsetting or indentation of the solid element. The joint between the at least two partial areas of the cloth according to the invention may be provided by a seam. A welding line joint, a seam joint with yarn, an adhesive joint, a rivet joint, or a combination of the above-mentioned joining techniques is suited as a joint.

The application of force is expediently performed by the clamping device in the region of the seam that is formed jointly by the at least two partial areas in the region of the offsetting or the indentation of the solid element. To this end, it is expedient to form a bag or a casing extending across the seam in which the clamping device is guided loosely.

In accordance with the invention, this bag may extend continuously over the entire length of the common seam. According to the invention it is also conceivable to guide the clamping device in a loop construction, so that an application of force is performed at particular, selected places of the soft top only, and it is thus possible to work out and model particular contours of the soft top with cloth.

For the arrangement and design of the bag or casing for guiding the clamping device it is of importance that the respective area of the application of force is selected such that no disturbing aesthetic influences such as, for instance, tightenings, foldings, seam concentrations are generated.

For fixing the bag or casing at a partial area or at a plurality of partial areas of the cloth it is possible to use seam technology, adhesive technology, welding technology, riveting technology, or other joining technologies. A combination of the aforementioned joining techniques is also possible. It is in particular the use of seams with yarn that can be of importance when considering the aesthetic overall impression.

Apart from the designing of a so-called styling edge which fulfils substantially aesthetic functions, the arrangement and the design of a technical function edge or groove, making use of the cloth according to the invention, has to be chosen such that a water removing function is established. The function edge or groove of the soft top may expediently be adjacent to a function edge at the carriage.

To this end, the at least one solid element may extend substantially parallel or orthogonally to the longitudinal axis of the vehicle, and thus edges and grooves may be formed which extend substantially parallel or orthogonally to the longitudinal axis of the vehicle. As already stated, the arrangement of function grooves for the safe and reliable removal of water is of importance for the present invention.

Figure 2:
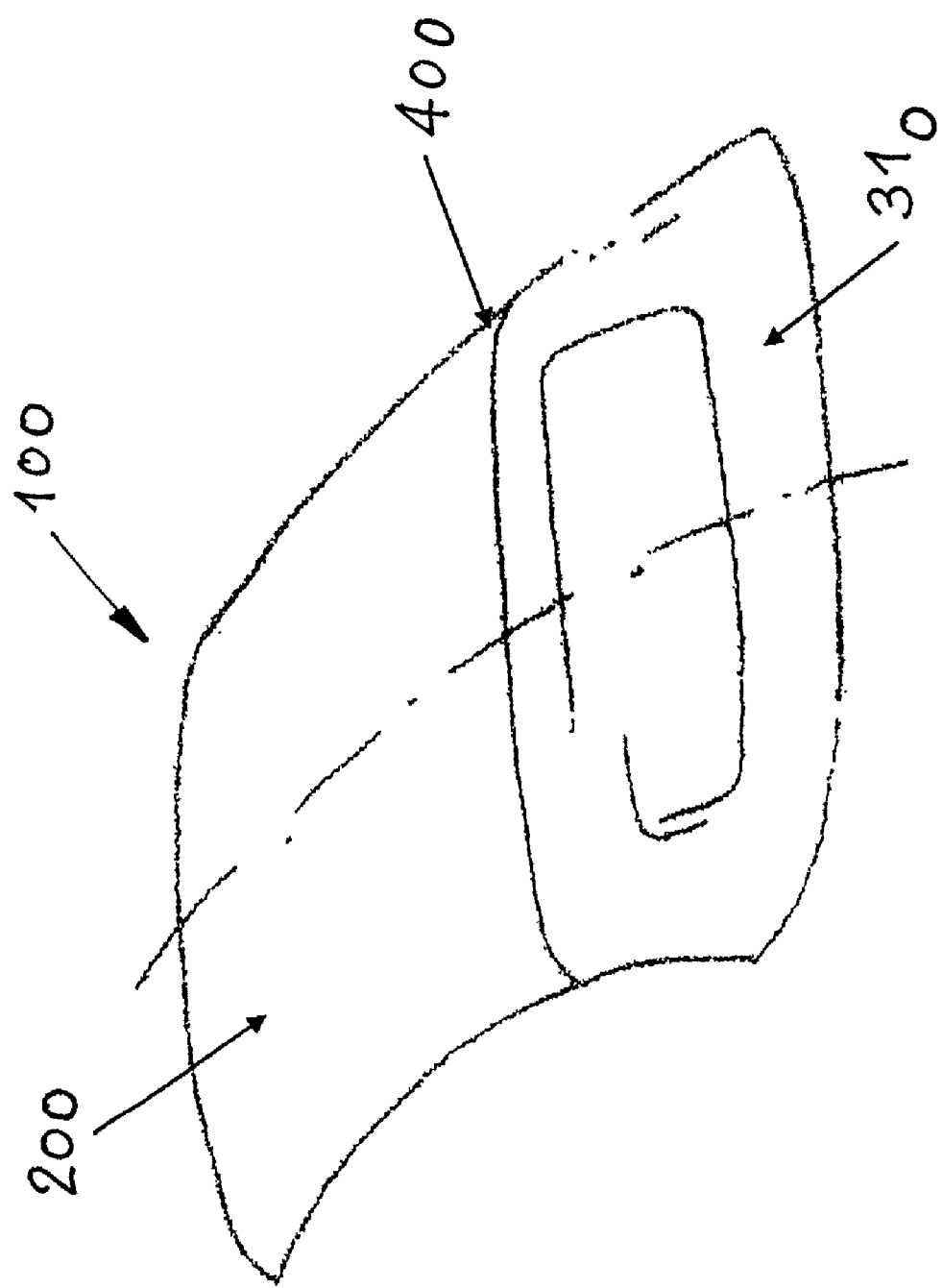
Figure 3:
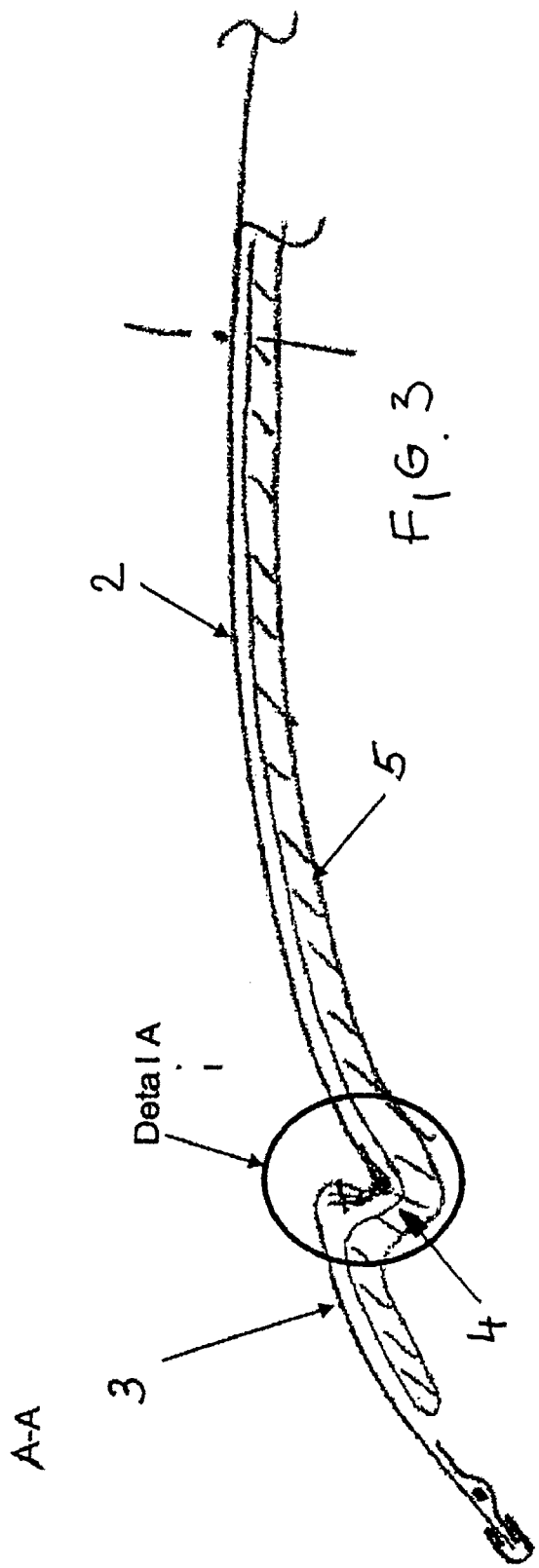
Figure 5:
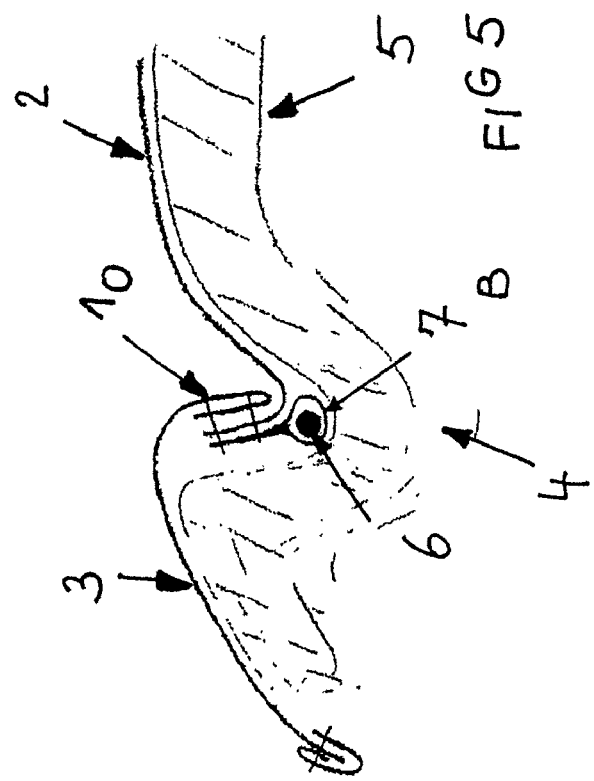
Figure 4:
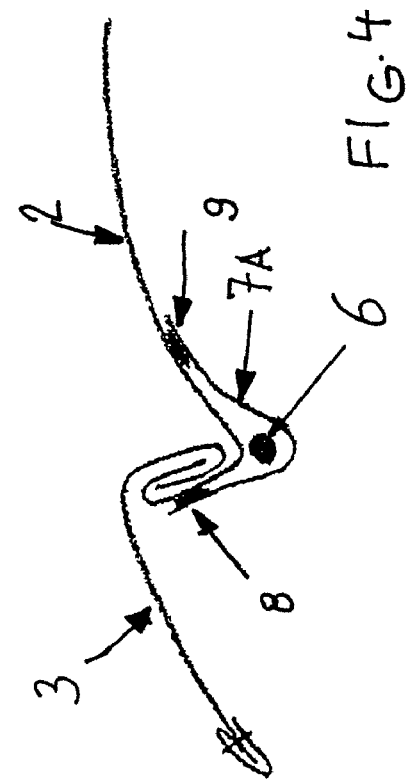

Two preferred embodiments of the present invention will be explained in more detail by means of the following Figures. There show:

FIG. 1 a perspective system representation of an embodiment of the cloth according to the invention with a soft top with a styling edge extending parallel to the longitudinal axis of the vehicle;

FIG. 2 a perspective system representation of a further embodiment of the cloth according to the invention with a soft top with a styling edge extending orthogonally to the longitudinal axis of the vehicle;

FIG. 3 a sectional view A-A through the styling edge pursuant to FIG. 1;

FIG. 4 a first systematic sectional view of the detail A pursuant to FIG. 3 without convertible top bow;

FIG. 5 a second systematic sectional view of the detail A pursuant to FIG. 3 with convertible top bow.

The preferred embodiment of the present invention pursuant to FIG. 1 shows a soft top 1 having a longitudinally extending styling edge 40 that is arranged between a cloth side part 3 and the cloth middle part 2. For reasons of symmetry, a longitudinally extending styling edge is positioned at both sides of the soft top (not designated in detail).

The preferred embodiment of the present invention pursuant to FIG. 2 shows a soft top 100 having a transversely extending styling edge 400 that is arranged between a cloth side part 310 and the cloth middle part 200.

In a further preferred embodiment of the present invention (not illustrated), the styling edge extends in the middle of the cloth middle part.

In a further preferred embodiment of the present invention (not illustrated), several longitudinally and transversely extending styling edges extend across the soft top. It is also according to the invention that the styling edge covers only a partial area of the soft top (not illustrated), so that, for instance, the area above the doors or the rear window is provided with a styling edge.

FIG. 3 shows the sectional view A-A through the styling edge with the cloth side part 3 and the cloth middle part 2. The seam of these two partial areas is illustrated in more detail in detail A. The two partial areas 2 and 3 are stretched over a solid element, here the convertible top bow 5, which forms an offsetting 4. For better illustration, a gap was provided between the cloth side part 3 and the cloth middle part 2, which does, however, actually not exist. The cloth 2, 3 stretches over the solid element, here the convertible top bow 5, without a gap and adapts itself thereto.

According to FIG. 4 in which no solid element is shown, a possible preferred embodiment for a bag 7A for guiding the clamping device 6 is illustrated. In this preferred embodiment, the bag 7A is formed by a fabric or textile web of collar-shaped design which is joined at its side edges 8 and 9 with the cloth middle part 2. In this embodiment, the application of force is performed via two lengths, namely via the side edges 8 and 9. It is also conceivable according to the invention that the bag 7A is also fixed at the cloth side part 3 (not illustrated).

Pursuant to FIG. 5, the clamping device 6 is guided in a bag 7B that is designed as a casing and rests in the offsetting 4 of the convertible top bow 5. The cloth side part 3 and the cloth middle part 2 form a joint seam 10 that also includes the fixing of the bag 7B. This way, the force is applied to the cloth only via one length, namely via the seam 10.

The invention claimed is:

1. A cloth for a soft top which is designed to be stretchable over at least one solid element, comprising:
a solid element having at least one offsetting or indentation, and that said cloth overstretching said solid element is deformed by suitable longitudinally extending elastic clamping devices such that said cloth follows substantially the contour of said offsetting or indentation forming a gutter depression longitudinally extending at a lateral edge of the soft top.

2. The cloth of claim 1, wherein the clamping device is designed to be flexible and inherently unstable.

3. The cloth of claim 1, wherein the clamping device is joined with said cloth in a form-locking manner.

4. The cloth of claim 1, wherein the clamping device is guided loosely in a bag that is arranged at said cloth.

5. The cloth of claim 1, wherein the clamping device substantially rests in the sole of said offsetting or indentation in the stress state.

6. The cloth of claim 1, wherein at least two partial areas of the cloth are joined in the region of said offsetting or indentation.

7. The cloth of claim 6, wherein at least two partial areas form a common seam in the region of said offsetting or indentation.

8. The cloth of claim 7, wherein the common seam is designed such that the application of force through said clamping device is performed via said common seam.

9. The cloth of claim 4, wherein the bag in which said clamping device is guided is also joined with said cloth via said joint seam.

* * * * *